(12) United States Patent
Wakeman

(10) Patent No.: US 8,522,809 B2
(45) Date of Patent: Sep. 3, 2013

(54) GAS REGULATOR WITH VENTING BONNET

(75) Inventor: Robert Warren Wakeman, Watertown, SD (US)

(73) Assignee: Illinois Tool Works Inc., Glenview, IL (US)

( * ) Notice: Subject to any disclaimer, the term of this patent is extended or adjusted under 35 U.S.C. 154(b) by 449 days.

(21) Appl. No.: 12/475,113

(22) Filed: May 29, 2009

(65) Prior Publication Data

US 2009/0301582 A1  Dec. 10, 2009

Related U.S. Application Data

(60) Provisional application No. 61/059,102, filed on Jun. 5, 2008.

(51) Int. Cl.
  *G05D 11/00*  (2006.01)
(52) U.S. Cl.
  USPC ............... 137/116.5; 137/68.19; 137/505.42
(58) Field of Classification Search
  USPC .............. 137/68.19, 68.23, 505.11, 116.5
  See application file for complete search history.

(56) References Cited

U.S. PATENT DOCUMENTS

| 2,687,143 A | | 8/1954 | Clair |
| 2,789,574 A | * | 4/1957 | Tucker ..................... 137/116.5 |
| 3,906,982 A | * | 9/1975 | Fleischhacker et al. ... 137/116.5 |
| 4,064,890 A | * | 12/1977 | Collins et al. ............ 137/505.42 |
| 4,484,695 A | | 11/1984 | Fallon et al. |
| 5,586,569 A | | 12/1996 | Hanning et al. |
| 5,657,787 A | | 8/1997 | Diehl |
| 5,711,340 A | * | 1/1998 | Gusky et al. ............... 137/68.19 |
| 6,019,121 A | * | 2/2000 | Uehara ...................... 137/116.5 |
| 7,334,598 B1 | * | 2/2008 | Hollars ..................... 137/116.3 |

OTHER PUBLICATIONS

International Search Report for application No. PCT/US2009/045915 mailed Aug. 20, 2009.
Written Opinion for application No. PCT/US2009/045915 mailed Aug. 20, 2009.

* cited by examiner

*Primary Examiner* — Len Tran
*Assistant Examiner* — Viet Le
(74) *Attorney, Agent, or Firm* — Fletcher Yoder, P.C.

(57) ABSTRACT

Systems and methods for venting gas from a gas regulator in the event of overpressurization of the gas regulator are provided. A bonnet for a gas regulator that includes one or more apertures through which gas may vent. The bonnet may be made of a moldable synthetic plastic material, such as glass filled nylon.

15 Claims, 5 Drawing Sheets

GAS REGULATOR WITH VENTING BONNET

CROSS REFERENCE TO RELATED APPLICATIONS

This application is a U.S. Non-provisional Patent Application of U.S. Provisional Patent Application No. 61/059,102, entitled "Regulator with Glass-Filled Bonnet", filed Jun. 5, 2008, which is herein incorporated by reference.

BACKGROUND

The present disclosure relates generally to gas regulators, and more particularly, to a gas regulator with a bonnet for venting gas in the event of overpressurization of the gas regulator.

Gas regulators are used in a variety of different industries and applications, such as welding, recreational vehicles, residential and commercial buildings, and so forth. Gas regulators provide important functions in applications that require a flow of compressed air or specialty gases, such as nitrogen, oxygen, argon, helium, acetylene, and so forth, typically stored in high pressure vessels or tanks. In general, such gas regulators operate by reducing the pressure of the gas from the container to a desired level that may be adjusted manually and read on a gauge attached to the regulator. In common industrial applications, the gas flows from storage cylinders to provide gas at acceptable levels for use in welding and cutting operations. Such gas regulators traditionally include a variety of internal components (e.g., springs, plates, and washers), which cooperatively function to handle both normal operating demands and extreme circumstances.

A bonnet is traditionally used to contain the internal components inside the gas regulator. Such bonnets are typically made from a metal, such as brass or zinc, since the bonnets must be designed to withstand high pressures (e.g., 3000 PSI) during extreme instances of overpressurization (e.g., in case of failure of the regulating components). Metal bonnets are capable of withstanding such high pressures while containing potentially broken internal components that may be produced during a failure event. However, high monetary costs due to acquisition and preparation of the metal material are often associated with the use of such metal bonnets. Accordingly, there exists a need for improved bonnets for gas regulators that withstand high pressures while reducing monetary costs.

BRIEF DESCRIPTION

The present disclosure provides novel systems and methods for venting gas from a gas regulator in the event of overpressurization of the gas regulator. The methods and systems provided herein allow for the simplification of the production of components of the gas regulator and may reduce the monetary cost of both the bonnet and the overall regulator assembly. In particular, the present disclosure provides a bonnet for a gas regulator that includes apertures through which gas may vent during instances of pressure. Certain embodiments of the bonnet may be made of a moldable synthetic plastic material. A method is provided that may be used during operation to vent gas from the gas regulator during instances of overpressurization. The method includes venting gas through a path that includes an aperture in an upper surface of the bonnet.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

As discussed in further detail below, various embodiments of a gas regulator with a bonnet are provided to regulate pressure and vent gas during instances of overpressurization. The gas regulator is partially made of a synthetic polymer rather than a metal and is capable of venting gas out of apertures in the bonnet during overpressurization. The disclosed embodiments include a bonnet made of non-metal materials such as glass filled nylon. The bonnet may include an insert that lodges in the bonnet via an interference fit and provides threads for receiving an adjustment screw. The bonnet is sufficiently strong to contain the internal components of the regulator, and includes apertures to vent excess pressures in the event of failure of any of the internal components (e.g., 3000 PSI from the gas container). The foregoing features, among others, may have the effect of reducing monetary cost of gas regulators with bonnets while providing the ability to vent gas during instances of overpressurization.

In particular, the gas regulator is configured to employ a venting mechanism. Accordingly, in a presently contemplated embodiment, a plurality of apertures for venting gas are provided on an upper surface of the bonnet above a skirt. Excess pressure conditions may cause a diaphragm, a diaphragm washer, and/or a backup plate to collapse within the regulator, all of which may be at least partially forced upwardly into or through a spring, allowing gas to flow out the apertures on the upper surface of the bonnet. Such a venting mechanism may allow the bonnet and/or other internal components to be made of non-metal materials because the apertures reduce the pressure drop across the structural wall of the bonnet.

Figure 1:
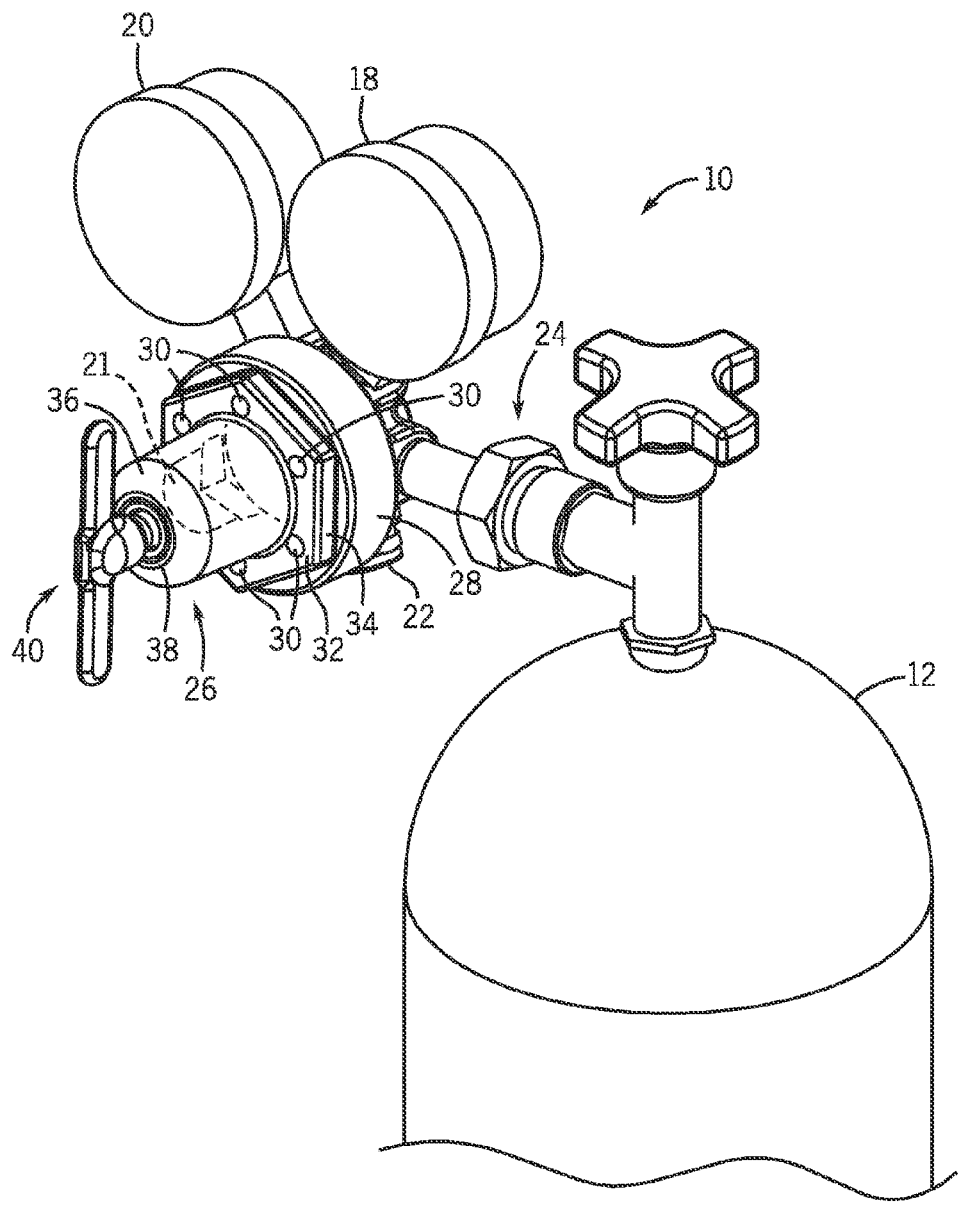
FIG. 1 illustrates an exemplary gas regulator attached to a gas tank in accordance with aspects of the present disclosure.
Figure 2:
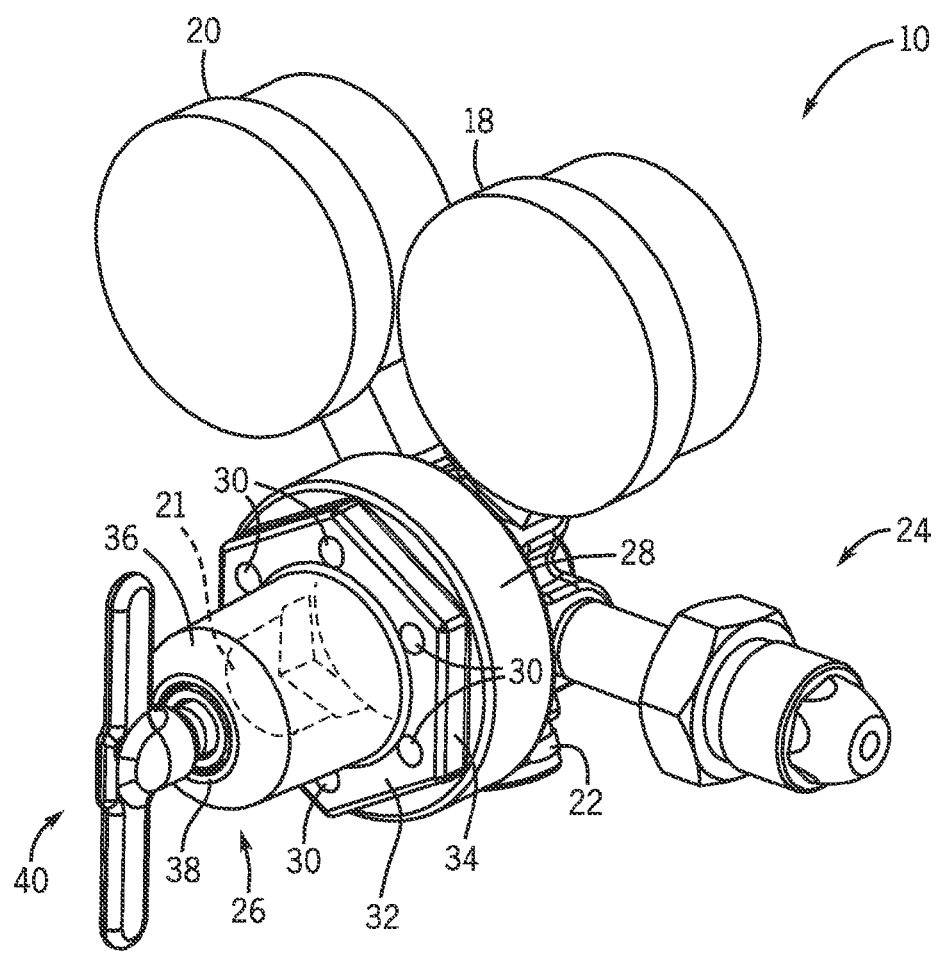
FIG. 2 is a perspective view of an exemplary gas regulator in accordance with aspects of the present disclosure.

Turning now to the drawings, FIGS. 1 and 2 generally illustrate perspective views of an exemplary gas regulator assembly 10. FIG. 1 illustrates the gas regulator assembly 10 attached to a gas tank 12 via a fixture. The gas regulator assembly 10 includes an inlet gauge 18, which indicates a measurement of the pressure at an inlet of the gas regulator assembly 10, and an outlet gauge 20, which indicates a measurement of the pressure at an outlet 21 of the gas regulator assembly 10. A relief valve assembly 22 allows pressurized gas to flow out of the gas regulator assembly 10 when the pressure exceeds a predetermined limit. The relief valve assembly 22 may include a seat, a seat retainer, a spring, a relief valve body, and so forth. An inlet assembly 24 provides a fluid inlet, through which gas may flow. The inlet assembly 24 may include bushings, nuts, tailpieces, filters, washers, and so forth.

A bonnet 26 screws onto a body (not shown in these figures) to house internal components central to the operation of the gas regulator assembly 10. The bonnet 26 includes a skirt 28, which forms the base of the bonnet 26. The illustrated bonnet 26 includes apertures 30 on an upper surface 32 of a hexagonal base 34 through which gas may vent during instances of overpressurization. The illustrated embodiment includes six apertures 30 on the bonnet 26. However, it should be noted that in alternate embodiments, more or fewer apertures 30 may be provided. The bonnet 26 further includes an extension 36 that is configured to receive an insert 38 and an adjusting screw 40. The adjusting screw 40 is screwed into the bonnet 26 during operation of the gas regulator assembly 10 to allow a user to establish a desired outlet pressure.

Figure 3:
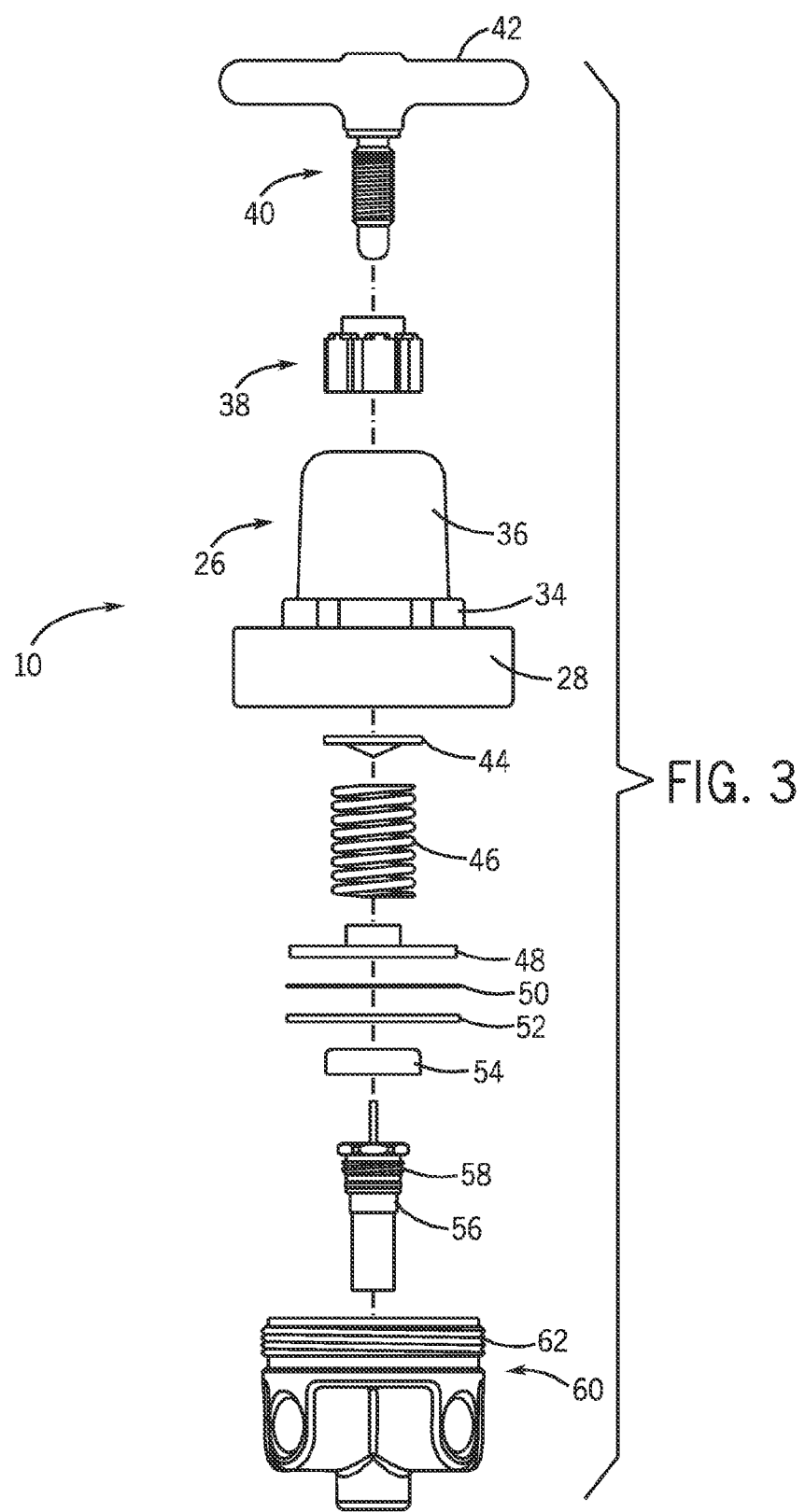
FIG. 3 is an exploded view of the exemplary gas regulator of FIG. 2 in accordance with aspects of the present disclosure.

FIG. 3 is an exploded view of the gas regulator assembly 10 of FIG. 2. The adjusting screw 40 includes a rotating handle 42 that may be used to position the adjusting screw 40. The insert 38 is configured to lodge in the bonnet 26 via an interference fit. The insert 38 also provides threads for receiving the adjusting screw 40. In some embodiments, the bonnet 26, the adjusting screw 40, or a combination thereof may be made of a moldable synthetic plastic material. For instance, in one embodiment, the bonnet 26 may be made of 30% glass filled nylon. This feature may have the effect of reducing the monetary cost of the gas regulator assembly 10 as compared to traditional systems, which include bonnets made of metals, such as brass or zinc. The insert 38 may be made of nylon, for example.

The gas regulator assembly 10 further includes a spring button 44, which is used to direct the movement of a spring 46 during its compression and expansion. The spring 46 is elastically deformed during compression, thus generating a variable and controllable force that determines the selected outlet (regulated) pressure. The spring 46 includes a central opening that is configured to sit on a backup plate 48, which centers the spring 46 in the gas regulating assembly 10. In certain embodiments, the backup plate may be made of glass filled nylon. A diaphragm washer 50 is provided to prevent a diaphragm 52 from bunching during operation. In some embodiments, the diaphragm 52 may be made of reinforced rubber. The backup plate 48 is further configured to allow pressure to be applied to the diaphragm 52. A pressure plate 54 is provided to oppose the pressure generated via compression of the spring 46 during operation. A seat assembly 56 with threads 58 is configured to receive the pressure plate 54 through a threaded engagement during use.

The bonnet 26 is threaded onto a body 60 via threads 62 to form a protective housing for the internal components 44, 46, 48, 50, 52, 54 and 56. The body 60 is manufactured such that an internal path exists for the flow of gas through the body 60. During assembly, the insert 38 is positioned in the bonnet 26, which is threaded onto the body 60, and the adjusting screw 40 is threaded into the bonnet 26. As the adjusting screw 40 is threaded into the bonnet 26, the spring 46 becomes compressed between the spring button 44 and the backup plate 48, thus increasing the gas force that must be applied downstream to oppose the spring force. Similarly, as the adjusting screw 40 is threaded out of the bonnet 26, the spring 46 expands, thus decreasing the gas force that must be applied downstream to oppose the spring force. Accordingly, the user may adjust the gas pressure via rotation of the handle 42 attached to the adjusting screw 40.

Figure 4:
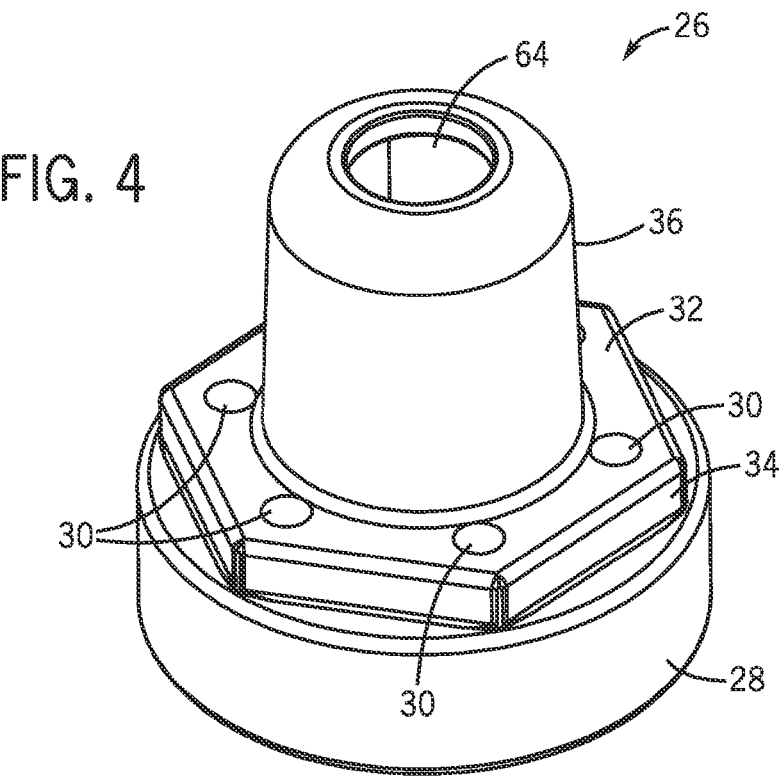
FIG. 4 is a perspective view of an exemplary bonnet including venting apertures in accordance with aspects of the present disclosure.
Figure 5:
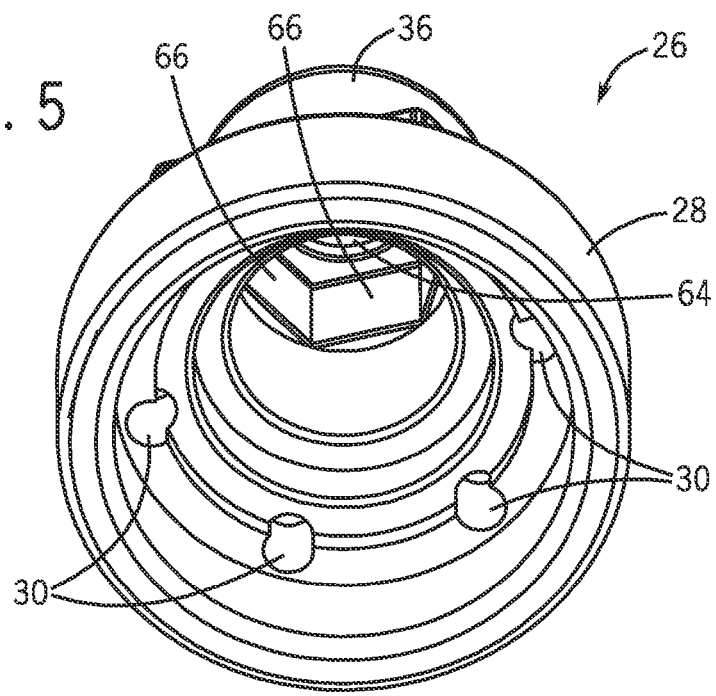
FIG. 5 is a bottom perspective view of the bonnet of FIG. 4 in accordance with aspects of the present disclosure.
Figure 6:
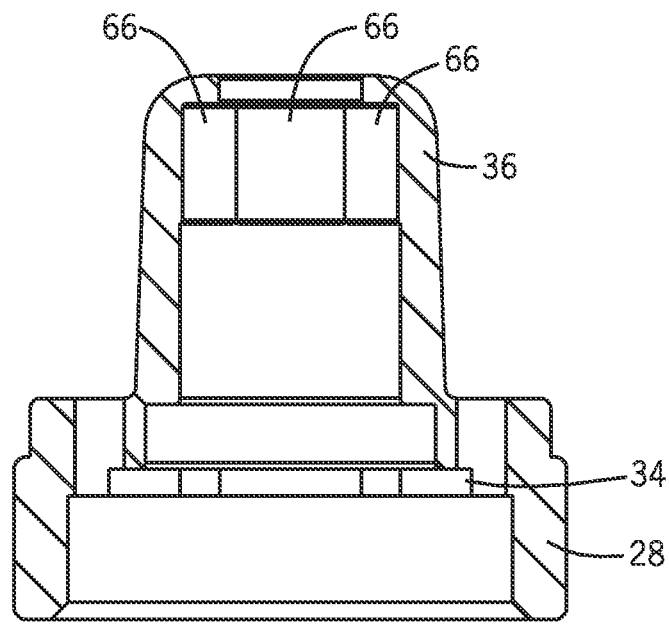
FIG. 6 is a sectional view of the bonnet of FIG. 4 in accordance with aspects of the present disclosure.

FIGS. 4, 5, and 6 illustrate the bonnet 26 in more detail. FIGS. 4 and 5 are perspective views of one embodiment of the bonnet 26, which is made of a moldable synthetic plastic, such as glass filled nylon. In the illustrated embodiment, an aperture 64 is provided that is configured to receive the insert 38 during assembly of the bonnet. The bonnet 26 is sufficiently strong to contain the internal components of the assembly, and to resist the spring force during normal operation. However, the bonnet 26 also includes apertures 30 located on the upper surface 32 of the hexagonal base 34 to vent excess pressures (e.g., 3000 PSI) during instances of overpressurization. That is, in the event of failure of one or more of the components of the regulator, the full pressure of the gas container may be communicated to the interior of the bonnet 26, and the gas is vented through the apertures as it flows from the container. Typically, the entire volume of the container may vent in this manner. In a presently contemplated configuration, the gas regulator assembly 10 is configured to employ a collapsing and venting approach, in which excess pressure conditions cause the diaphragm 52, the diaphragm washer 50, and/or the backup plate 48 to collapse, some or all of which may enter into or pass through the spring 46. This allows gas to flow along the spring 46 and out the apertures 30 on the upper surface 32 of the hexagonal base 34 of the bonnet 26. Such a collapsing and venting mechanism enables the bonnet 26 and/or other components of the gas regulator assembly 10 to be made of non-metal materials because the materials need not be strong enough to contain excess pressure during instances of overpressurization. Indeed, as compared to conventional metallic bonnets, the enhanced venting offered by the venting apertures 30 creates a reduced pressure differential across the bonnet wall, effectively reducing the force that the bonnet 26 must resist during venting. While this same approach could be used with conventional metal bonnet structures, it is particularly advantageous insomuch as it allows for less expensive materials to be used.

As illustrated in the bottom perspective view of FIG. 5 and the sectional view of FIG. 6, the apertures 30 for venting gas extend from the outside of the bonnet 26 to the inside of the bonnet 26 above the skirt 28. In certain embodiments, diameters of the apertures 30 for venting gas may be between approximately 0.2 and 0.3 inches. The aperture 64 in the top of the extension 36, which is configured to receive the adjusting screw 40, also extends from the outside of the bonnet 26 to the inside of the bonnet 26. An inside of the extension 36 includes a plurality of sides 66 that are configured to engage with the insert 38 during operation. That is, the insert 38 is configured to engage with the plurality of sides 66 and remain lodged in the extension 36 via an interference fit. In some embodiments, the insert 38 may be made of nylon.

Figure 7:
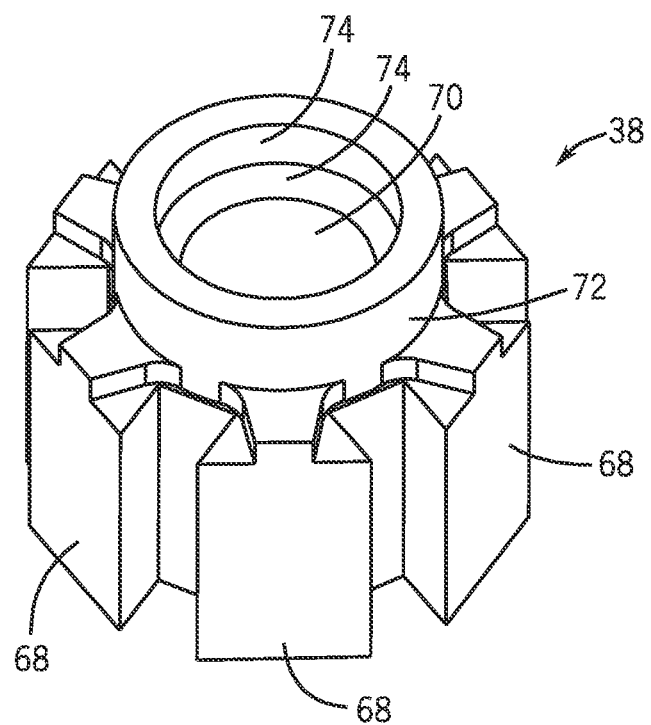
FIG. 7 is a perspective view of an insert that may be placed inside the bonnet of FIG. 4 in accordance with aspects of the present disclosure.

FIG. 7 illustrates the insert 38, which is configured to receive the adjusting screw 40, in more detail. The insert 38 includes a plurality of beveled sides 68 that are configured to sit directly against the sides 66 of the extension 36 of the bonnet 26. An aperture 70 that extends axially throughout the insert 38 is provided as a place for receiving and lodging the adjusting screw 40. An extension 72 of the insert 38 is configured to engage with the adjusting screw 40 during operation. Additionally, threads 74 are provided to secure the adjusting screw 40 to the insert 38 and the bonnet 26 during use.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A gas regulator comprising:
a body having an inlet and an outlet;
a gas regulating assembly disposed in the body and configured to regulate output pressure of gas delivered to the outlet reduced from inlet pressure of the gas at the inlet; and
a bonnet comprising a moldable synthetic plastic material, the bonnet being coupled to the body over the gas regulating assembly and being configured to contain one or more components of the gas regulating assembly, wherein the bonnet comprises:
 a skirt portion configured to secure the bonnet to the body;
 a base portion extending from the skirt portion and having at least one aperture disposed on an upper surface of the base portion for venting gas in the event of overpressurization of the gas regulator; and
 an extension extending from the upper surface of the base portion, being adjacent to the at least one aperture, and having an opening extending axially throughout the extension, wherein, in the event of overpressurization of the gas regulator, the opening is configured to receive at least a portion of a collapsed diaphragm, a collapsed diaphragm washer, a collapsed backup plate, or a combination thereof, to enable gas to pass into the bonnet and vent through the at least one aperture.

2. The regulator of claim 1, wherein the bonnet is made of a glass reinforced polymer.

3. The regulator of claim 2, wherein the bonnet is made of glass reinforced nylon.

4. The regulator of claim 1, wherein the bonnet further comprises an insert configured to be received and lodged in the opening of the extension to provide threads for receiving an adjusting screw.

5. The regulator of claim 4, wherein the insert comprises a plurality of beveled sides that are configured to directly contact inner sides of the extension to form an interference fit between the insert and the extension.

6. The regulator of claim 5, wherein the bonnet has six apertures for venting gas, the apertures being formed in the upper surface of the base portion.

7. The regulator of claim 6, wherein the apertures for venting gas have a diameter of between approximately 0.2 and 0.3 inches.

8. A gas regulator comprising:
a body having an inlet and an outlet;
a gas regulating assembly disposed in the body and configured to regulate output pressure of gas delivered to the outlet reduced from inlet pressure of the gas at the inlet; and
a bonnet comprising:
 a base comprising a skirt configured to secure the bonnet to the body of the gas regulator;
 an upper surface having at least one aperture for venting gas in the event of overpressurization of the gas regulator; and
 an extension having an opening extending axially throughout the extension and being disposed adjacent to the at least one aperture, wherein, in the event of overpressurization of the gas regulator, the opening is configured to receive at least a portion of a collapsed diaphragm, a collapsed diaphragm washer, a collapsed backup plate, or a combination thereof, to enable gas to pass into the bonnet and vent through the at least one aperture.

9. The regulator of claim 8, wherein the bonnet is made of a glass reinforced polymer.

10. The regulator of claim 9, wherein the bonnet is made of glass reinforced nylon.

11. The regulator of claim 8, comprising a plurality of apertures for venting gas.

12. The regulator of claim 11, wherein the apertures for venting gas have a diameter of between approximately 0.2 and 0.3 inches.

13. The regulator of claim 8, wherein the bonnet further comprises an insert configured to be received and lodged in the opening of the extension to provide threads for receiving an adjusting screw.

14. The regulator of claim 13, wherein the insert comprises a plurality of beveled sides that are configured to directly contact inner sides of the extension to form an interference fit between the insert and the extension.

15. The regulator of claim 13, wherein the insert is made of nylon.

* * * * *